June 30, 1959 W. W. PHARIS 2,892,890

INTERCEPT CIRCUIT

Filed May 22, 1956 5 Sheets-Sheet 1

INVENTOR.
WILLIAM W. PHARIS

BY

ATTORNEY

June 30, 1959 W. W. PHARIS 2,892,890

INTERCEPT CIRCUIT

Filed May 22, 1956 5 Sheets-Sheet 2

June 30, 1959 W. W. PHARIS 2,892,890

INTERCEPT CIRCUIT

Filed May 22, 1956 5 Sheets-Sheet 3

June 30, 1959 W. W. PHARIS 2,892,890

INTERCEPT CIRCUIT

Filed May 22, 1956 5 Sheets-Sheet 4

FIG. 4 DEAD LEVEL INTERCEPT CIRCUIT 147

COMMON INTERCEPT CIRCUIT 150

2,892,890

INTERCEPT CIRCUIT

William W. Pharis, Rochester, N.Y., assignor to General Dynamics Corporation, Rochester, N.Y., a corporation of Delaware Application May 22, 1956, Serial No. 586,474

10 Claims. (Cl. 179—6)

This invention relates to telephone systems and more particularly to means for intercepting calls extended through such systems.

A principal function of telephone systems is to provide means for extending calls to called lines. Occasionally, however, it is not possible to complete all telephone calls in a simple and uncomplicated manner. For example, there may be dialing errors which direct calls to unused, non-existing, abandoned, or otherwise unavailable subscriber lines. In the case of dialing errors, it is necessary to intercept calls and return signals or messages indicating that some other action should be taken. Another example of a need for means to intercept calls is illustrated by the case where subscribers move from one service area to another, thereby requiring new directory numbers. Calls extended to old numbers must be intercepted and calling subscribers must be informed of the fact that the called party has a new number. In the past, intercepted calls have been extended to manual operators who give individual service on each call. With the advent of larger systems, it has become apparent that manual intercept service is neither advisable nor economical; therefore, it is desirable to reduce the need for manual operators by using means for playing recorded messages instructing calling subscribers to consult their directories before dialing again. Very often, the recorded message may be repeated continuously. Therefore, it is desirable to provide means for connecting calling subscriber lines to the play-back means at the beginning of a recorded message, thereby avoiding subscriber confusion which otherwise might result from connections that are made in the middle of a recorded message.

An object of this invention is to provide new and improved call intercept means.

Another object of this invention is to provide means for causing intercept calls to be connected with play-back means at the start of recorded messages.

Still another object of this invention is to give simultaneous intercept service to a plurality of subscribers.

Yet another object of this invention is to give intercept service to individual subscribers while storing other calls, which may be waiting for intercept service.

I have shown two embodiments of my invention for providing intercept service by means of a recording. In one embodiment, all calls are received and stored until the beginning of a recorded message, at which time a first call is connected to receive the message. When that message is completed, the first call is released and a second call is connected to receive the message. In this manner, each call is individually connected to receive the recording. A single type of intercept line circuit may be provided for each individual line and for each dead level, so that all intercepted calls are treated in the same manner on an individual basis. In another embodiment of my invention, intercepted calls are given group service to expedite matters. Each time that a recording begins, calls having already heard the recorded message are disconnected from the recorded announcement and all calls then awaiting intercept service are connected to receive the message. In this embodiment there is one type of line circuit for subscriber lines and another type of line circuit for dead levels.

Other objects and advantages of my invention will become apparent as the following description proceeds and the features of novelty which characterize my invention will be set forth with particularity in the claims annexed to and forming a part of this specification.

It is thought that the invention will be understood better by making reference to the attached drawings, in which:

Fig. 1*a* shows, by block diagram, an embodiment of my invention by means of which calls are connected to the play-back means on an individual basis;

Fig. 1*b* shows an embodiment, also by block diagram, in which a group of lines are connected simultaneously to and play-back means;

Figs. 2 and 3, when joined in the manner shown in Fig. 6, illustrate the details of an embodiment that is also shown by Fig. 1*a*;

Figs. 4 and 5, when joined in the manner shown in Fig. 7, show details of the embodiment that is also shown in Fig. 1*b*;

Fig. 6 shows the manner in which Figs. 2 and 3 should be joined to provide a complete and understandable circuit; and, Fig. 7 shows the manner in which Figs. 4 and 5 should be joined to show a complete and understandable circuit.

The heavily inked rectangles in Figs. 1*a* and 1*b* indicates that portion of the system which is shown in detail in the remaining drawings, and which includes the major portion of the invention. The remaining rectangles, shown by lightly inked lines, are given by way of example only. Any suitable equipment may be used to supply the function indicated by these rectangles.

I have tried to show specific items and to use simple terms where possible to facilitate an understanding of my invention; however, I want it understood that the showing and use of these specific items and terms is not to act in any manner as a disclaimer of the full range of equivalents which is normally given under established rules of patent law. For example, I have shown my invention in connection with a step-by-step telephone system when, in fact, my invention may be used in connection with other types of telephone systems. Also, the detailed drawings show the source of office potential by means of simple plus (+) and minus (−) signs. As in the case of most telephone systems, the positive or plus terminal is described as being connected with ground; hence, the terms "(−) battery" and "ground (+)" are used hereinafter. It should be understood that this or any other suitable power supply may be used. Unused switch capacity has been shown as dead levels on selectors; whereas, many different types of calls to or through unused equipment may be provided for. In a similar manner, many other examples of possible equivalents might be cited.

*Brief description*

Referring to Fig. 1*a*, there is shown a telephone system which may be used to complete calls. For example, subscriber A initiates calls by removing a handset or receiver responsive to which a suitable circuit is completed for causing line circuit 101 to be marked as serving an unanswered call. Allotter 102 and line finder 103 cooperate to find this line. Thereafter, subscriber A dials to cause selector 104 and connector 105 to seize line circuit 106 and signal subscriber B. On the other hand, if subscriber A dials a non-existing number, thereby directing a switch, such as 104, to seize unused switch capacity, such as a dead level of contacts, a circuit is completed through dead level intercept circuit 110, intercept line circuit 120, common intercept circuit 112 and a playing back means in the form of recorder 113. A message played by recorder 113 tells subscriber A that the call cannot be completed and that a directory should be consulted before the call is repeated. If subscriber A dials a directory number of a subscriber line which is out of service or is otherwise unavailable, a circuit is completed through connector 105, intercept line circuit 111, common intercept circuit 112 and recorder 113, to tell the calling subscriber, by means of a recorded message, to consult a directory before repeating the call. Both of these calls are completed to the recorder on an individual basis. That is, only one call may be admitted to receive the recorded message at any given time, assuming that many subscribers are simultaneously placing calls that are to be given intercept service. As soon as the recording is completed, that call is released and another call is connected to receive the recording. Any suitable playing back means may be provided to accomplish the above cited functions. However, I have found that a tape recorder is satisfactory when provided with an endless tape on which messages may be recorded for repeated play.

Fig. 1*b* shows a telephone system for giving simultaneous service to a plurality of intercepted calls. Subscriber C may call subscriber D over switching means including line circuit 141, allotter 142, line finder 143, selector 144, connector 145 and line circuit 146, in the manner outlined above in connection with the call from subscriber A to subscriber B. Sometimes subscriber C may direct a switch, such as selector 144, for example, to a dead level, thereby extending a connection through dead level intercept circuit 147 and common intercept circuit 150 to recorder 151. On the other hand, if subscriber C dials the directory number of a subscriber line which is out of service, a connection is completed from connector 145 through intercept line circuit 148, and common intercept circuit 150 to recorder 151. The difference between the systems shown in Figs. 1*a* and 1*b* is that, in Fig. 1*b*, a plurality of subscriber lines may be admitted to receive the recorder message simultaneously. After the first group of subscriber lines have received the recorded message, a gate circuit operates to disconnect them and to admit the next group of subscriber lines that may be awaiting intercept service.

*Detailed description of Figs. 2 and 3*

Figure 1A:
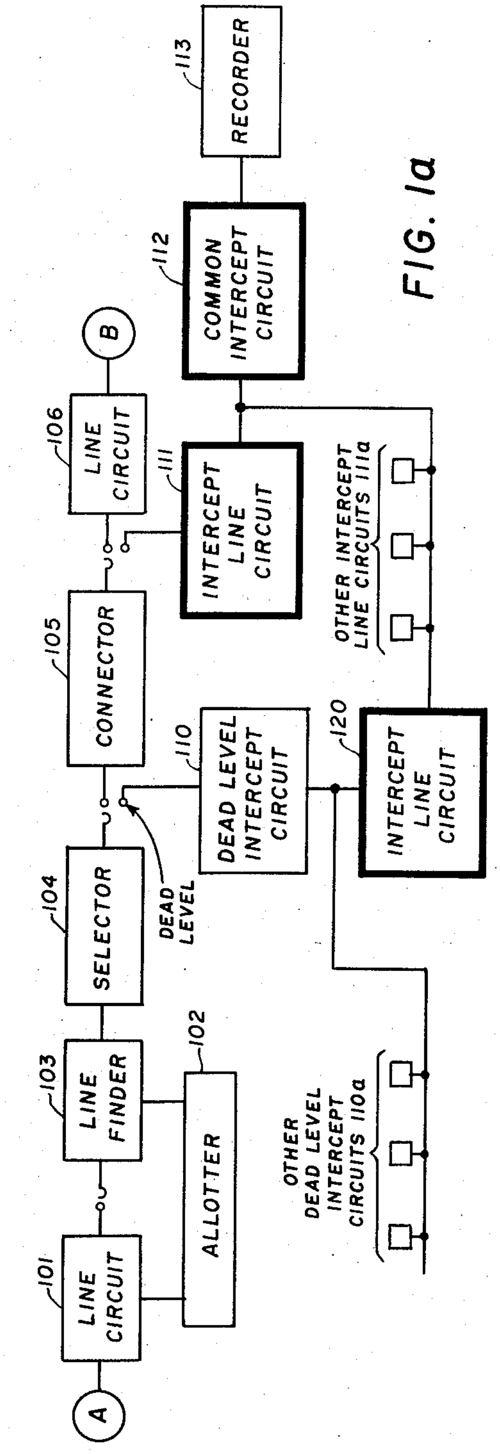
Figure 1B:
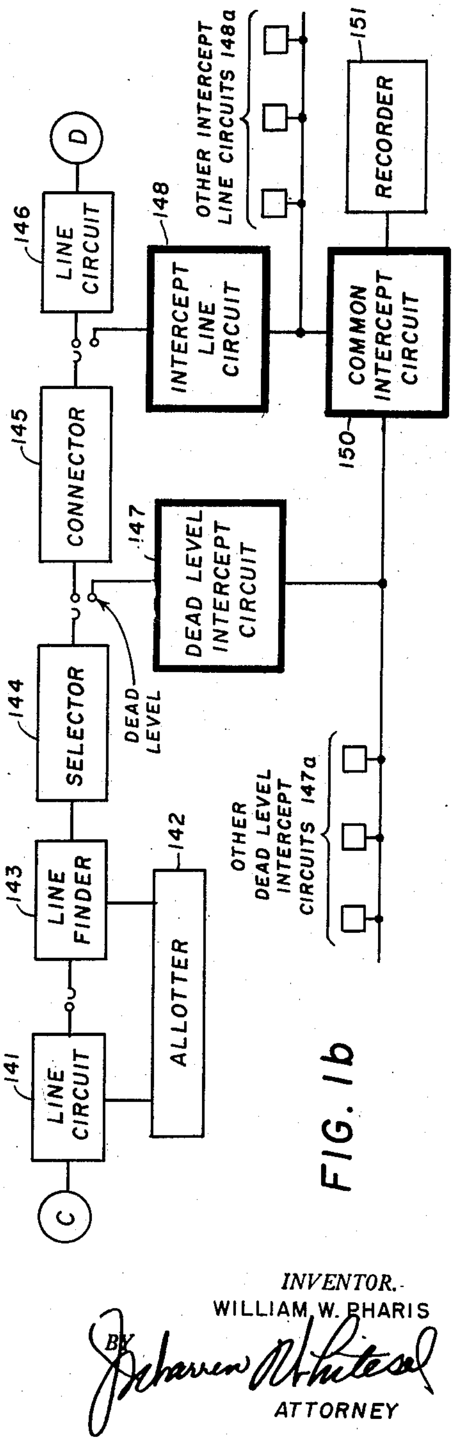
Figure 2:
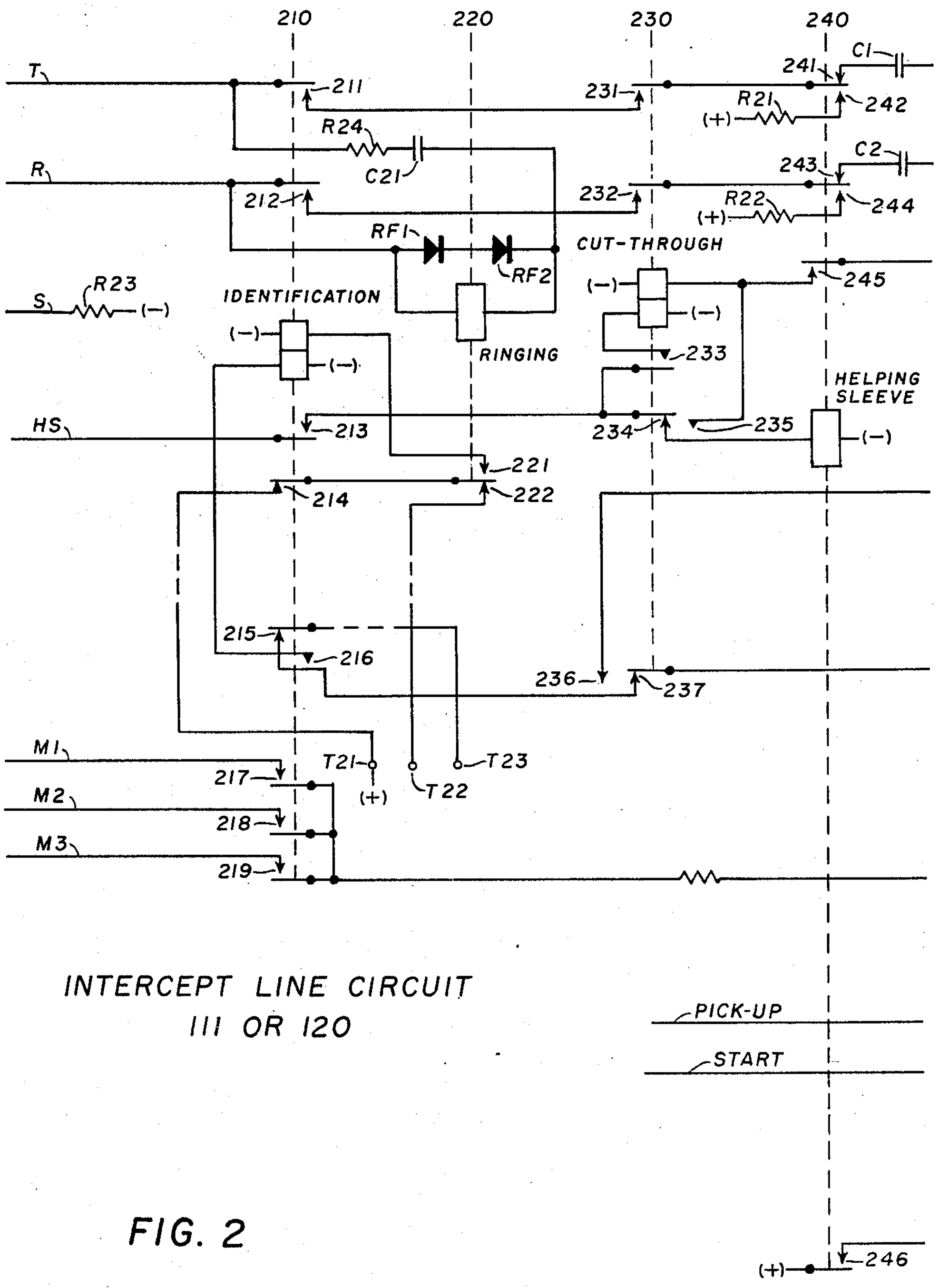
Figure 3:
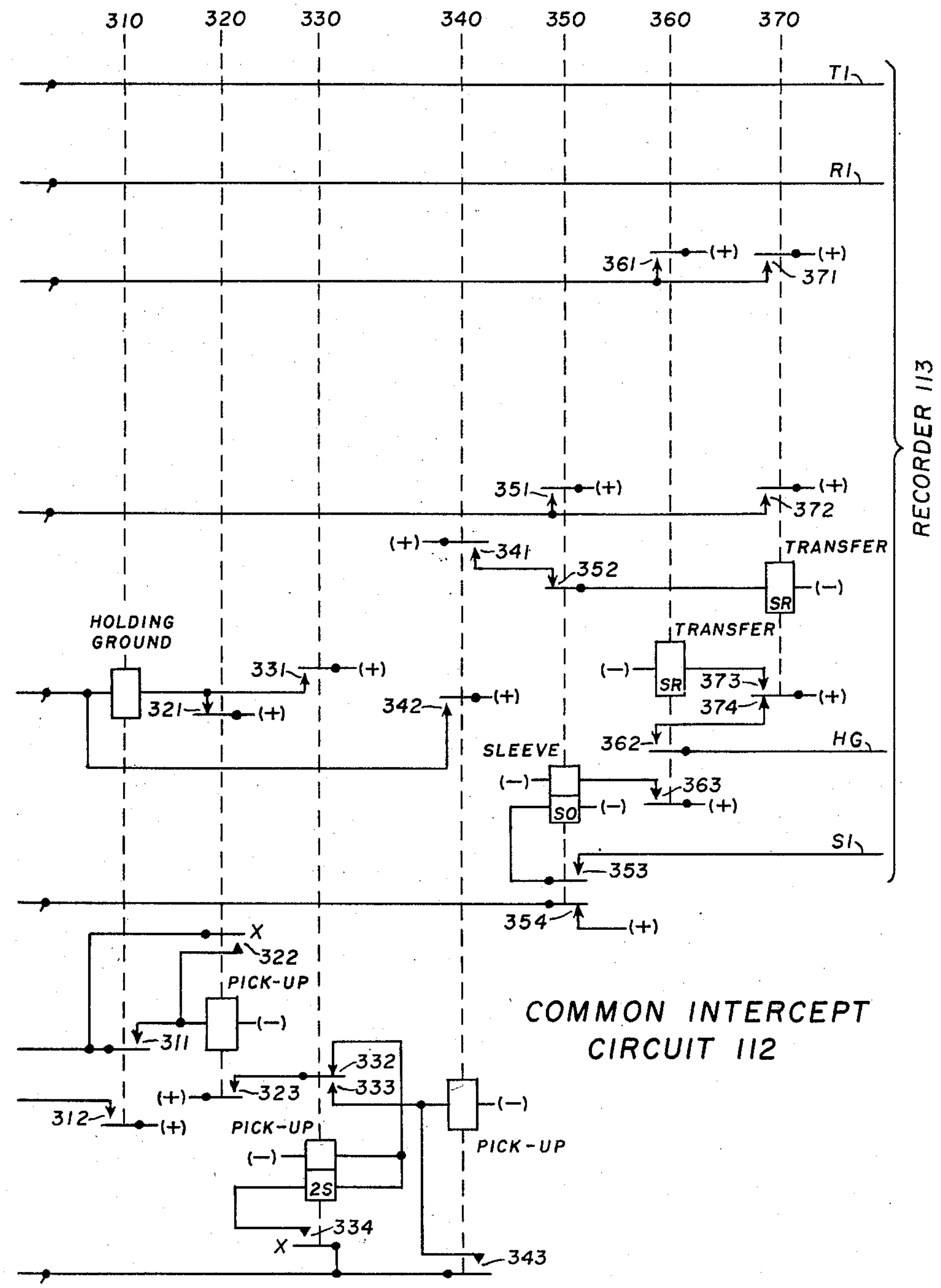

It is thought that a better understanding of the invention will be had by making reference to the detailed circuits, shown by Figs. 2 and 3, which provide means whereby each call may be connected with recorder 113 on an individual basis. It is assumed that a call has been directed either through a dead level of selector 104 (Fig. 1) or through connector 105 to an intercept line circuit, i.e., intercept line circuits 111 or 120 which may be identical. On calls through connector 105, ringing current is transmitted in a conventional manner. But, on calls through dead levels, a special dead level intercept circuit 110 is provided to extend ringing current. In either event, ringing current is connected across conductors T and R (upper left-hand corner of Fig. 2). Connector switchthrough is assured because sleeve S is permanently marked by means of a (−) battery potential that is extended through resistor R23. Helping sleeve conductor HS is connected to ground by either connector 105 or dead level intercept circuit 110, as the case may be. Conductors M1, M2 and M3 are marked by connector 105 or dead level intercept circuit 110 according to the particular code or frequency that may be used to ring the called subscriber. Hence, markings on conductors M1–M3 determine which calls are to be intercepted in the case of party line service.

Means is provided for seizing intercept line circuit 111 or 120 when ringing current is applied by means (not shown) to conductors T and R. This ringing current is extended over the circuit that may be traced from conductor T through resistor R24, capacitor C21, and the winding of ringing relay 220 to conductor R. Relay 220 responds to all codes and frequencies of ringing current that may be transmitted over conductor R. Responsive thereto, contacts 221 close and if no other intercept line circuit is then connected with common intercept circuit 112, identification relay 210 operates over the circuit that may be traced from (−) battery through the upper winding of relay 210, operated contacts 221, rest contacts 214, a chain of contacts (not shown) to ground at terminal T21. If any other intercept line circuit, corresponding to circuit 111 or 120, is connected with common intercept circuit 112 at this time, the chain circuit leading from contacts 214 to terminal T21 is broken so that relay 210 cannot operate. Also responsive to the operation of relay 220, contacts 222 open to break a second chain circuit including contacts T22 which extends through other intercept line circuits. This second chain circuit is also useful for preventing two or more intercept line circuits such as 111, for example, from being connected simultaneously with common intercept circuit 112. Means is provided for testing to determine whether intercept service is or is not to be given on this particular call. That is, responsive to the operation of relay 210, contacts 211 and 212 close, thereby extending conductors T and R toward common intercept circuit 112. Contacts 213 close to extend helping sleeve conductor HS to control helping sleeve relay 240. Contacts 214 open the chain circuit leading through corresponding intercept line circuits to terminal T21 for marking common intercept circuit 112 as busy. Contacts 215 open to break a second chain circuit for a similar reason. Indentification relay 210 is connected at contacts 216 to be held operated from a ground marking applied over the circuit which may be traced from (−) battery through the lower winding of identification relay 210, operated contacts 216, rest contacts 237, the winding of holding ground relay 310, and rest contacts 321 to ground (+). Also, holding ground relay 310 operates over this circuit. Contacts 217–219 close to test for whether intercept service is or is not to be provided on this particular call. If the call is to be intercepted, suitable means (not shown) is provided in a preceding circuit to connect the appropriate conductor M1, M2 or M3, as the case may be, to conductor HS so that a circuit may be traced from ground (+) on contacts 354 to contacts 217–219, conductors M1–M3, the preceding circuit, conductor HS, operated contacts 213, rest contacts 234 and the winding of helping sleeve relay 240 to (−) battery. Hence, relay 240 operates only if there is to be intercept.

Responsive to the operation of relay 240, contacts 242 and 244 close, thereby preparing for ring trip. Contacts 245 close to prepare a circuit for operating cut-through relay 230 later during the call.

As explained above, holding ground relay 310 operates when identification relay 210 closes contacts 216. Responsive thereto, contacts 311 close to connect the conductor marked "Pick-Up" to control relay 320 and contacts 312 close to start any suitable common equipment such as an interrupter or pulse generator, for example. The conductor marked "Pick-Up" is connected with the common means for generating ringing current. A ground pulse appears on the "Pick-Up" conductor at the start of each ringing cycle to operate pick-up relay 320 over contacts 311. Responsive thereto, contacts 321 open to de-energize relay 210 which could under some circumstances lock itself in an operated condition if it were not for this de-energization responsive to the pick-up pulse.

The first contacts that are operated by pick-up relay 320 are its "X" or preliminary contacts 322 which lock pick-up relay 320 to ground potential applied to the conductor marked "Pick-Up" independently of any continued operation of contacts 311. Shortly thereafter, contacts 321 open to de-energize the lower winding of identification relay 210; however, it may not release at this time since it may be held over its upper winding because ringing relay 220 is still operated by ringing current. Assuming that identification relay 210 does release at this time, there is little, if any, effect because it reoperates almost at once, as explained below. In a similar manner, holding ground relay 310 may be released when contacts 321 open. Contacts 312 may open responsive to the release of relay 310, however, the common equipment continues to operate throughout its cycle and, as will be pointed out below, the conductor designated "Start" will be remarked by ground potential before that cycle expires.

Returning to the operation of pick-up relay 320, contacts 323 close, thereby operating two-step, pick-up, slave relay 330 to the first of its two steps over the circuit extending from ground (+) through contacts 323, 332, and the upper winding of relay 330 to (−) battery. On this step, only the "X" or preliminary contacts 334 close to prevent effective energization of the lower winding of relay 330 by completing a shunt circuit that may be traced from ground (+) at contacts 323, through contacts 332, the lower winding of pick-up relay 330, operated contacts 334 and 246 to ground (+).

After another brief interval of time, the ground (+) potential is removed from the conductor designated "Pick-Up," thus causing pick-up relay 320 to restore and open contacts 323. Pick-up slave relay 330 is now operated to its second step responsive to the energization of both of its windings over the circuit which may be traced from (−) battery through the upper and lower windings of relay 330 in series, operated contacts 334 and 246 to ground (+). Responsive thereto, a circuit is prepared at contacts 333 for relay 340. Another circuit is completed through contacts 331, the winding of holding ground relay 310, rest contacts 237, 216 and the lower winding of identification relay 210 to (−) battery, thereby reoperating relays 210 and 310 if they released. As pointed out above, the period over which these two relays may release is so short that it has no significance. Contacts 312 close to re-mark the conductor designated "Start" and contacts 311 reconnect relay 320 to the conductor designated "Pick-Up." Nothing further happens until the next pulse appears upon the conductor marked "Pick-Up."

The next time that ground is applied to the conductor designated "Pick-Up," relay 320 operates and closes contacts 323 to complete a circuit from ground (+) through contacts 323, operated contacts 333, and the winding of pick-up slave relay 340 to (−) battery. Contacts 343 close thereby locking relay 340 to ground (+) at contacts 246. When contacts 342 close, holding ground relay 310 is shunted and released over the circuit extending from ground (+) through contacts 342, the winding of relay 310, and contacts 331 to ground (+). Contacts 311 open and since relay 310 is shunted for the duration of the call, pick-up relay 320 may not be reoperated by any further ground pulses that may be applied to the "Pick-Up" conductor. Also responsive to the operation of relay 340, contacts 341 close, thereby operating transfer relay 370 over a circuit including contacts 352. When relay 370 operates, contacts 371 close to operate relay 230 by applying ground (+) over the circuit extending through contacts 245 and the upper winding of cut-through relay 230 to (−) battery. Contacts 373 close to operate relay 360 over an obvious circuit. Contacts 374 have no function at this time.

When relay 230 operates responsive to a closure of contacts 371, as explained above, tip and ring conductors T and R are connected through contacts 231 and 232, respectively. Ringing is tripped because ground is now applied to conductors T and R through the resistance of elements R21 and R22, contacts 242 and 244, contacts 231 and 232, and contacts 211 and 212 to conductors T and R. Contacts 233 close, thereby connecting a circuit from (−) battery through the lower winding of cut-through relay 230, contacts 233, 213 and conductor HS for control from a preceding circuit. Contacts 234 open and 235 close, thereby completing a circuit extending from (−) battery through the winding of helping sleeve relay 240, contacts 235, 245 and 371 to ground (+). When cut-through relay 230 closes contacts 236, identification relay 210 is held operated over the circuit extending from (−) battery through the lower winding of relay 210, operated contacts 216, 236 and 372 to ground (+).

When transfer relay 360 operates, as explained above, alternate ground (+) is connected at contacts 361 to hold cut-through relay 230. Contacts 362 close to prepare for controlling recorder 113. Sleeve relay 350 is operated over an obvious circuit when contacts 363 close.

Responsive to the operation of sleeve relay 350, a circuit is completed at contacts 351 for applying an alternate ground (+) potential to the lower winding of identification relay 210. Contacts 352 open to de-energize transfer relay 370. It should be noted that relay 350 is slow operate and relay 370 is slow release; therefore, there is a brief interval of time before transfer relay 370 restores to open contacts 373 and de-energize relay 360.

There is another brief time period determined by the slow release characteristics of transfer relay 360, during which a circuit is completed from ground (+) through contacts 374, 362 and over conductor HG to recorder 113 to initiate a playing back of the recorded message. After relay 360 releases, both of the contacts 361 and 371 are opened so that helping sleeve relay 240 restores, thereby connecting talking conductors T and R to recorder 113 at contacts 241 and 243. The termination (including resistors R21 and R22) that is used to trip ringing is disconnected at contacts 242 and 244. Sleeve relay 350 does not release when transfer relay 360 restores to open contacts 363 because the recorder 113 returns ground (+) potential over sleeve conductor S1 and contacts 353 as long as the recording is being transmitted. When the recording is terminated, this ground (+) potential is removed and sleeve relay 350 releases. Responsive thereto, contacts 351 open thereby releasing identification relay 210 and, in turn, contacts 213 open to restore cut-through relay 230.

The circuits of Figs. 2 and 3 are now returned to normal and nothing further happens until the next intercepted call is received.

Figure 4:
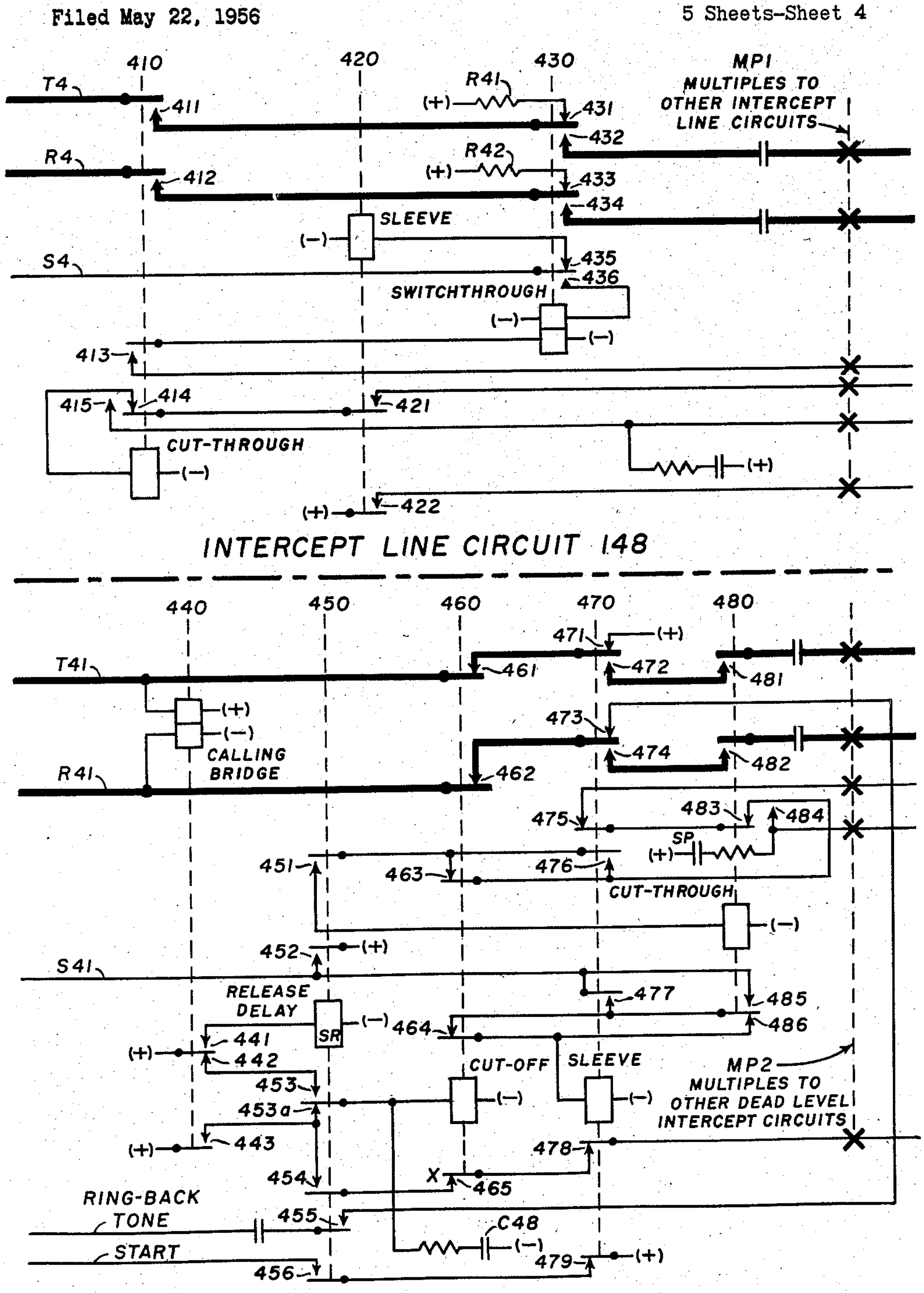
Figure 5:
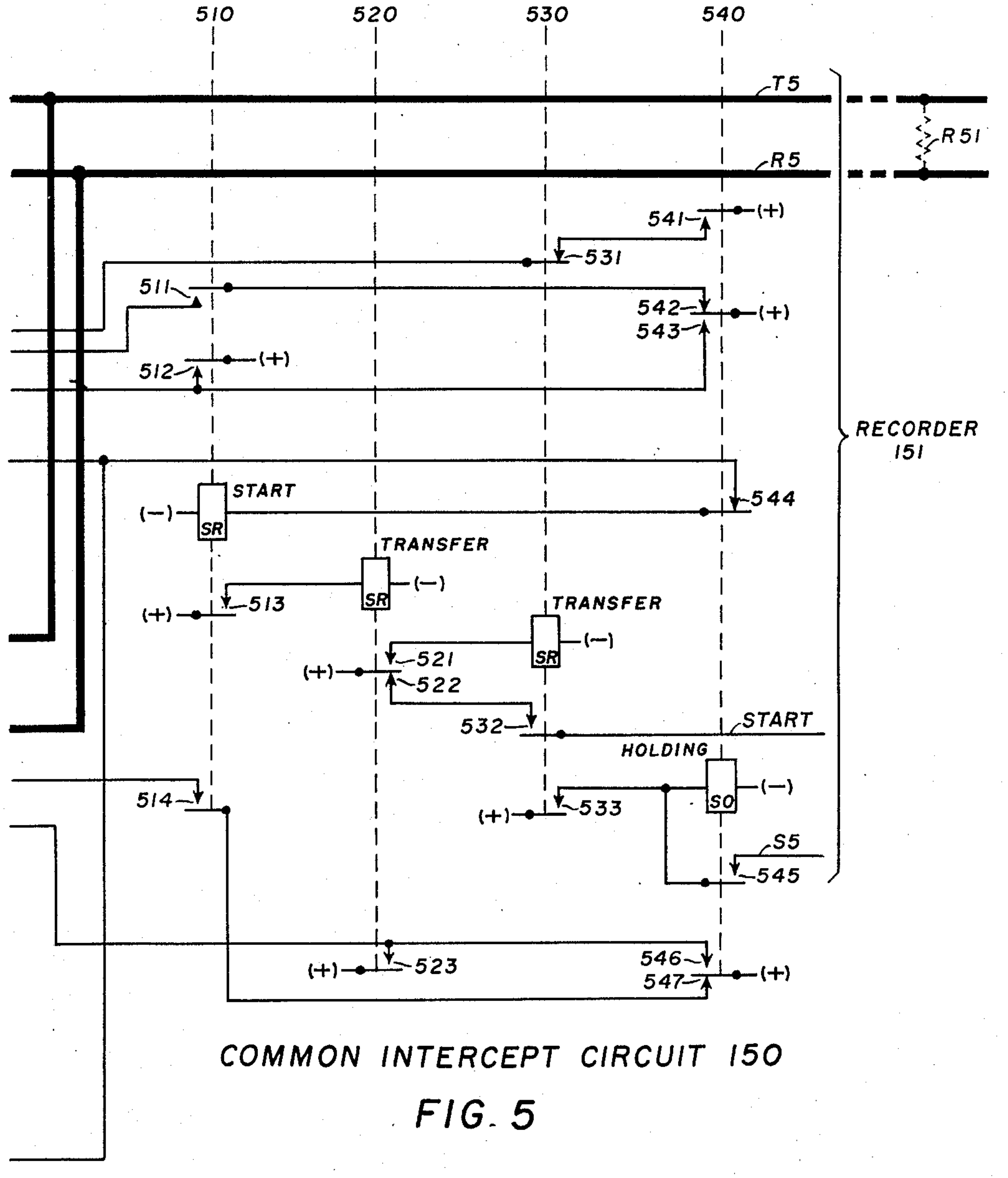
Figure 6:
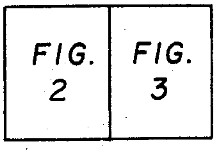
Figure 7:
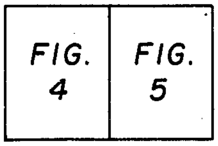

*Detailed description of Figs. 4 and 5*

Next, reference is made to the embodiment of the invention which is shown generally in Fig. 1*b* and specifically in Figs. 4 and 5.

Means is provided for connecting intercepted calls to a recorder simultaneously and on a group basis. In this case, a special dead level intercept line circuit is provided, thereby eliminating the need for a separate intercept circuit such as item 110 which is provided in Fig. 1*a*.

Means is provided for preventing the subscribers who are connected on a group basis from talking to each other. That is, the playing back means, recorder 151, has characteristics which present a very low impedance shown generally by a resistor R51 (Fig. 5). In this manner, there is virtually a short circuit across conductors T5 and R5 thus shunting voice currents which originate at subscriber stations. The characteristics of recorder 151 are such that it functions properly despite the low impedance shown by resistor R51.

Referring to the detailed showing in Figs. 4 and 5, dead level intercept circuit 147 is shown in the lower half of Fig. 4 while intercept line circuit 148 is shown in the upper half of Fig. 4. Common intercept circuit 150 is shown in Fig. 5.

*Intercepted call to subscriber line.*—The next call to be described is one which is incoming through intercept line circuit 148 which is seized when the preceding circuit applies a ground (+) marking by any suitable means (not shown) to sleeve conductor S4, contacts 435 and the winding of sleeve relay 420 to (−) battery. When relay 420 operates, contacts 421 close to prepare a circuit for cut-through relay 410 while contacts 422 close to operate start relay 510 over a circuit which extends from ground (+) through contacts 422, 544, the winding of start relay 510 and (−) battery. Relay 510 operates contacts 511 which, in turn, causes cut-through relay 410 to operate over the circuit that may be traced from (−) battery through the winding of cut-through relay 410, rest contacts 414, operated contacts 421, operated contacts 511 and rest contacts 542 to ground (+). Cut-through relay 410 operates and locks at its contacts 415 to ground (+) applied through operated contacts 512. When contacts 411 and 412 close, conductors T4 and R4 are connected to a ring trip circuit which extends from ground (+) through resistors R41 and R42, contacts 431 and 433, and contacts 411 and 412. Contacts 413 close to prepare a circuit for operating switchthrough relay 430; however, it does not operate at once because contacts 541 are now standing open. As will be pointed out below, this delay in operating switchthrough relay 430 is provided to insure time enough to trip ringing.

Returning to the operation of start relay 510, contacts 514 are not used except during calls which are extended from a dead level in a selector. Contacts 513 close to complete an obvious circuit for operating transfer relay 520. Responsive thereto, contacts 521 close to complete a circuit for operating relay 530. When relay 530 operates, contacts 533 close, thereby energizing slow operate holding relay 540 which does not operate for a brief time period. After this time period, contacts 541 close; however, contacts 531 are now open. Contacts 543 close to apply alternate ground for holding cut-through relay 410 over the circuit extending from (−) battery through the winding of relay 410, operated contacts 415 and 543 to ground (+). Contacts 544 open to de-energize slow release start relay 510 which restores after some time. Responsive thereto, contacts 511 and 512 open; however, cut-through relay 410 continues to be held operated from ground (+) applied at contacts 543. Contacts 513 open and another brief time interval passes until the slow release period of transfer relay 520 has expired. Responsive thereto, relay 520 restores and opens contacts 521 to de-energize transfer relay 530. Again, there is a time delay period before slow release relay 530 restores during which period a circuit is completed from ground (+) through contacts 522, 532 and the conductor marked "Start" to initiate operation of recorder 151. Recorder 151 returns a ground (+) potential over conductor S5 and contacts 545 to hold relay 540 until the end of the recorded message.

Means is provided for connecting all calls awaiting intercept service to playing back recorder 151 at this time whereby a group of subscribers may hear the recording simultaneously. That is, if it is assumed that two or more calls are extended to receive intercept service at this time, each is connected through a line circuit similar to circuit 148 to a multiple point indicated by the heavily inked cross-marks designated MP1. In each line circuit there is a switchthrough relay corresponding to relay 430 which, when operated, connects talking conductors T4 and R4 from the calling subscriber line to recorder 151, thereby affording simultaneous service to a plurality of subscribers. More specifically, after still another brief time period, marked by the slow release characteristics of relay 530, contacts 531 close to operate switchthrough relay 430 over the circuit that may be traced from (−) battery through the lower winding of switchthrough relay 430, operated contacts 413, rest contacts 531 and operated contacts 541 to ground (+). Responsive to the operation of switchthrough relay 430, contacts 431 and 433 open, thereby removing the ring trip termination R41 and R42 while contacts 432 and 434 close for connecting the talking conductors to recorder 151 to receive the recorded message. The time delay introduced by relays 510–530 is provided to insure a sufficient interval for removing the ringing current. Switchthrough relay 430 locks in an operated condition over the circuit that may be traced from (−) battery through its upper winding, operated contacts 436 and sleeve conductor S4 to the preceding circuit. When contacts 531 close, switchthrough relays in other intercept line circuits operate in a manner which corresponds to that described above in connection with relay 430. Each of these relays, in turn, connects suitable talking conductors to conductors T5 and R5 as explained above in connection with contacts 432 and 434.

Nothing further happens while recorder 151 is playing back its recording. After the recording is completed, the ground (+) marking is removed from conductor S5, thereby releasing holding relay 540. Responsive thereto, contacts 541 open, thus breaking one of the circuits to switchthrough relay 430 which continues to hold via conductor S4 until the calling subscriber hangs up at which time the ground (+) marking is removed from sleeve conductor S4. Contacts 543 open thus releasing cut-through relay 410 which in turn opens contacts 411 and 412, thereby disconnecting talking conductors T4 and R4 from playing back recorder 151.

The common intercept circuit 150 is returned to normal and nothing further happens until the next group of calling lines is connected to the recorder 151.

*Unused switch capacity or dead level intercept.*—The next call to be described is one which is assumed to be incoming over unused switch capacity or dead levels of switching means such as from the bank of selector 144 (Fig. 1*b*). These calls are extended by any suitable means to dead level intercept circuit 147 which is shown in detail in the lower half of Fig. 4.

Means is provided to seize dead level intercept circuit 147 when a loop is completed across conductors T41 and R41 by any suitable preceding equipment. Responsive thereto, calling bridge relay 440 operates over the circuit that may be traced from ground (+) through the upper winding of relay 440, conductor T41, a loop extending through the preceding switching means, and conductor R41 to (−) battery through the lower winding of calling bridge relay 440. When contacts 441 close, release delay relay 450 operates over an obvious circuit. Contacts 443 close to prepare an operate circuit for start relay 510.

When release delay relay 450 operates, contacts 456 close to start any common equipment that may be required to complete the call, such as a tone generator, for example. Also responsive to the operation of relay 450, contacts 455 close, thereby extending ring-back tone as a signal for indicating to the calling subscriber that no more digit pulse trains should be transmitted. The circuit for the ring-back tone may be traced from the conductor designated "Ring-Back Tone" through contacts 455, 473, 462, conductor R41, the loop extending to the calling subscriber station, and return over conductor T41 to contacts 461 and 471 to ground (+). Upon hearing ring-back tone, the calling subscriber should discontinue dialing. The following description is prepared under the assumption that dialing does end at this time with a description of what happens if dialing does not end reserved until later. Contacts 454 close to operate start relay 510 over the circuit that may be traced from (−) battery through the winding of relay 510, operated contacts 544, 478, 465, 454 and 443 to ground (+). Contacts 452 close to extend a busy and holding ground to the preceding switching equipment while contacts 451 close to prepare a circuit for cut-through relay 480. When start relay 510 operates, contacts 511 and 512 close, but they are not material to this particular call. Contacts 513 close to operate transfer relay 520 over an obvious circuit. Contacts 514 close, thereby operating relay 480 over a circuit connected from ground (+) extended through contacts 547, 514, 475, 483, 463, 451 and the winding of cut-through relay 480 to (−) battery.

When relay 480 operates, contacts 481 and 482 close to complete one point in the talking circuit. Contacts 484 close to prepare a locking circuit for relay 480. Contacts 485 close to operate sleeve relay 470 over the circuit that may be traced from (−) battery through the winding of relay 470, rest contacts 464, operated contacts 485 and 452 to ground (+).

Sleeve relay 470 opens contacts 471 and 473 thereby terminating the transmission of ring-back tone and closes contacts 472 and 474 thereby connecting the talking conductors T41 and R41 to recorder 151. Relay 470 also opens contacts 475 thereby breaking the original operating circuit for cut-through relay 480; however, it continues to be held due to the locking circuit which has been completed from (−) battery through its windings, contacts 451, 476, 484 and 523 to ground (+). Contacts 477 close to complete a locking circuit extending from (−) battery through the winding of sleeve relay 470, contacts 464, 477 and 452 to ground (+). Contacts 478 open to break the circuit to start relay 510 while contacts 479 open to remove the ground (+) marking which was connected with the conductor designated "Start."

Means is provided for connecting all calls awaiting dead level intercept service to receive the recorded message simultaneously. That is, each call is extended through a dead level intercept line circuit similar to circuit 147 to the points indicated by heavily inked crossmarks designated "MP2." In each dead level intercept circuit, there is a relay corresponding to cut-through relay 480 which operates in parallel with relay 480 to connect a pair of talking conductors to receive the recorded message. These connections are made simultaneously and on a group basis.

Means is provided for playing back a recording. That is, returning to a description of start relay 510 which originally operated when release delay relay 450 operated, contacts 513 close thus energizing transfer relay 520. Relay 520 in turn closes contacts 521 to operate the second transfer relay 530. Relay 530 closes contacts 533 to operate holding relay 540 and closes contacts 532 to prepare a circuit for starting recorder 151. Relay 540 is a slow operate relay so that some time expires before it operates, after which contacts 546 close to complete an alternate locking path for cut-through relay 480 while contacts 544 open to de-energize start relay 510. However, due to its slow release characteristics, some time passes before it releases at which time contacts 513 open to de-energize transfer relay 520. Relay 520 is also a slow release relay so that still more time goes by before it restores. Contacts 523 open after that time; however, cut-through relay 480 has already locked to ground at contacts 546. Contacts 522 close to complete a circuit via contacts 532 and the conductor marked "Start" to initiate operation of recorder 151 which begins a playback of the recorded message. The recorder returns ground potential over conductor S5 and contacts 545 for locking holding relay 540. Also responsive to the release of relay 520, contacts 521 open to restore transfer relay 530 after the expiration of still another slow release time interval. When relay 530 restores, contacts 533 open to break the original operating circuit for holding relay 540 which, however, continues to hold over conductor S5 until the end of play-back as explained above.

Means, effective at the end of playing back, is provided to release the group of calls that were connected to receive this message. In greater detail, the recorder 151 is arranged to remove ground (+) at the end of playing back, thereby releasing holding relay 540. This in turn opens contacts 546 to restore cut-through relay 480 which had been holding, in the manner explained above, over a circuit including (−) battery, the winding of relay 480, contacts 451, 476, 484 and 546 to ground (+). When cut-through relay 480 restores, it opens contacts 481 and 482, thereby disconnecting the talking conductors from recorder 151. Contacts 485 open, however, sleeve relay 470 continues to hold via contacts 477 and conductor S41. The sleeve relay does not restore until the calling subscriber releases, at which time the loop across conductors T41 and R41 is broken so that calling bridge relay 440 is restored. Responsive thereto, contacts 441 open to restore release delay relay 450.

The circuit is now returned to normal and nothing further happens until the next group of calls are received.

*Subscriber fails to discontinue dialing.*—On occasions, the calling subscriber either does not hear or does not respond to the ring-back tone that is applied, as explained above, when selector 144 (Fig. 1) seizes a dead level. Assuming that the calling subscriber continues to dial, digit pulses are transmitted which cannot be used to extend the call further and, therefore, must be absorbed. Furthermore, means should be provided to prevent dial clicks from being heard by other subscribers who might be connected in multiple at points MP2.

In greater detail, the digit pulses which may be used in this system are transmitted in the form of open loop pulses. That is, conductors T41 and R41 extend through preceding means to a loop circuit that is completed through impulsing contacts. Each time that a digit pulse is sent, these impulsing contacts break the loop. Responsive thereto, calling bridge relay 440 (Fig. 4) restores and pulsing contacts 442 close to repeat a digit pulse into dead level intercept circuit 147, thereby completing the circuit from ground (+) through contacts 442, 453, and the winding of cut-off relay 460 to (−) battery. Also, capacitor C48 is charged over this circuit. Cut-off relay 460 operates responsive to the first pulse in a digit pulse train and continues to be held throughout that entire digit pulse train due to the charge stored upon capacitor C48. Contacts 441 also open responsive to each digit pulse; however, release delay relay 450 continues to be held due to its slow release characteristics.

When relay 460 operates, "X" or preliminary contacts 465 operate first to break the circuit to start relay 510 thus releasing it if no other call is connected through multiple point MP2 at this time. Contacts 464 open to restore sleeve relay 470, thereby reapplying ring-back tone to the talking conductors via the circuit that may be traced from the conductor marked "Ring-Back Tone" to contacts 455, 473, 462, conductor R41, the loop extending to the calling station, conductor T41, contacts 461 and 471 to ground (+). Contacts 461 and 462 open during dial pulsing to prevent the talking conductors from being connected into the common intercept circuit 150 and further to prevent any possible transmission of bothersome dial clicks to other subscribers who may be multipled to conductors T41 and R41 at the points marked MP2.

At the end of each digit pulse train transmitted into circuit 147, capacitor C48 discharges through the winding of relay 460 since contacts 442 are held open by calling bridge relay 440. After capacitor C48 has discharged sufficiently, cut-off relay 460 restores for returning the circuit to the condition that it was in when it was first seized and for further extending the intercept calls. If any further digit pulses are transmitted into dead level intercept circuit 147, cut-off relay 460 operates as explained above to disconnect the calling subscriber from the common intercept circuit 150, thereby canceling the further extention of the intercept call.

At the end of subscriber dialing, the circuit functions in the manner described above in the section entitled "Unused switch capacity or dead level intercept."

It should be noted that the slow-release time for relays 510—540 provides a delay feature thereby allowing enough time to be sure that the subscriber is not going to start to dial another train of digit pulses. Of course, the subscriber may always delay for a period which is longer than the time provided by relays 510—540 and yet dial again; however, it is thought that this is unlikely because usually the subscriber hears the ring-back tone before the time period expires.

*Gate circuit*

Each of the two embodiments of my invention provides means for admitting a line or lines (as the case may be) to receive the recorded message only at the start of that message and for releasing the line or lines at the end of the recorded message. These features are explained in detail in the foregoing specification. Briefly in resume, a cut-through relay must operate before each of the intercepted calls may be connected to receive the recorded message. However, each of the common intercept circuits is adapted to prevent the operation of a cut-through relay during the play-back of a recorded message by means utilizing a marking extended by the recording means for the duration of the message. At the end of the message, the recording means removes the marking for causing the common intercept circuit to operate the cut-through relay thereby gating a new line or lines to receive the message. Also responsive to removal of the marking, the line or lines that have just received the recorded message are released.

In greater detail, Figs. 2 and 3 show this feature in connection with cut-through relay 230 which originally operates over the circuit extending from (—) battery through the upper winding of relay 230, contacts 245 and 371 to ground (+). After relay 230 operates, it locks under the influence of identification relay 210 which in turn is locked at contacts 351. Relay 350 remains operated for the duration of the call due to the ground marking that is returned over conductor S1 by playing back recorder 113. During this period, no other cut-through relay may operate because contacts 352 are standing open; hence, relays 360 and 370 are released so that contacts 361 and 371 are open. Also, relay 210 is held operated to open two chain circuits at contacts 214 and 215, to guard against double seizure. At the end of the recording, ground is removed from conductor S1 to release relay 350. Responsive thereto, contacts 352 close to render relays 360 and 370 operative and thereby permit control of another cut-through relay. Contacts 351 open to release identification relay 210 thereby releasing the calling line at contacts 211 and 212. Also, the next call may be connected to receive the recording when the chain circuits are closed at contacts 214 and 215.

A similar gating is provided in the embodiment of Figs. 4 and 5. That is, as long as the message is being played-back, ground is returned on conductor S5 to operate hold relay 540. This in turn holds contacts 542 and 546 open so that other cut-through relays similar to relays 410 and 480 may not operate, thus preventing the connection of lines to playing back recorder 151 in the middle of a recording. At the end of the recorded message, ground is removed from conductor S5, relay 540 releases, contacts 543 and 546 open, and cut-through relays 410 and 480 release to disconnect the calling lines at contacts 411 and 412 and at contacts 461 and 462. The next group of calls may be connected to receive service after contacts 544 close to prepare start relay 510.

While I have described specific embodiments of my invention there are various modifications which may be made without departing from the scope of my invention. Therefore, it is my intention to cover in the attached claims not only the particular embodiments that are shown but also all modifications which may fall within the true spirit of my invention.

What I claim is:

1. In a telephone system, a plurality of subscriber lines, means for extending calls between said lines, some of said lines being unavailable, means for intercepting calls extended to said unavailable lines, means for playing back a recording explaining the unavailability of said lines, means effective at the start of said recording for extending one of said intercepted calls to receive said recording, means for preventing the extension of other of said intercepted calls to receive said recording while said one intercepted call is extended thereto, means for releasing said one intercepted call at the end of said recording, and means for thereafter extending a second of said intercepted calls to receive said recording.

2. In a telephone system, a plurality of subscriber lines, means for extending calls between said lines, some of said lines being unavailable, means for intercepting calls to said unavailable lines, means for playing back a recording explaining the unavailability of said lines, means for simultaneously extending a group of subscriber lines that are involved in said intercepted calls to receive said recording, and means effective while said group of intercepted calls are extended to receive said recording for preventing the extension of other intercepted calls to receive said recording; means for preventing conversation between the subscriber lines involved in said intercepted calls when extended in said group comprising means for connecting an impedance to said subscriber lines involved in said intercepted calls, said impedance being a value such that it virtually shunts voice currents originating on said subscriber lines; means for releasing said group of subscriber lines involved in said intercepted calls at the end of said recording, and means for thereafter extending a second group of subscriber lines involved in other intercepted calls to receive said recording.

3. In a telephone system, a plurality of subscriber lines, means for extending calls between said lines, some of said means for extending calls having unused capacity, means for intercepting calls extended through said unused capacity, means for playing back a recording explaining why said intercepted calls may not be completed, means for extending one of said intercepted calls to receive said recording, and means for preventing the extension of other of said intercepted calls to receive said recording while said one intercepted call is extended thereto.

4. The telephone system of claim 3 and means for releasing said one intercepted call at the end of said recording, and means for thereafter extending a second of said intercepted call to receive said recording.

5. In a telephone system, a plurality of subscriber lines, means for extending calls between said lines, some of said means for extending calls having unused capacity, means for intercepting calls extended through said unused capacity, means for playing back a recording explaining why said intercepted calls may not be completed, means for simultaneously extending a group of said subscriber lines that are involved in said intercepted calls to receive said recording, means effective while said group of subscriber lines are extended to receive said recording for preventing the extension of other intercepted calls to receive said recording, means whereby said playing back means is connected to said group of subscriber lines involved in said intercepted calls to provide a relatively low impedance of a value such that it virtually shunts voice currents originating on said subscriber lines, means for releasing said group of subscriber lines involved in said intercepted calls at the end of said recording, and means for thereafter extending a second group of subscriber lines involved in other intercepted calls to receive said recording.

6. In a telephone system, a plurality of subscriber lines, means for extending calls between said lines, some of said lines being unavailable, means for intercepting calls extended to said unavailable lines, some of said means for extending calls having unused capacity, means for intercepting calls extended through said unused capacity, means for playing back a recording explaining why said intercepted calls may not be completed, means for simultaneously extending a group of said intercepted calls to receive said recording, means effective while said group of calls are extended to receive said recording for preventing the extension of other intercepted calls to receive said recording, means for releasing said group of intercepted calls at the end of said recording, and means for thereafter extending a second group of intercepted calls to receive said recording.

7. In a telephone system, a plurality of subscriber lines, means for extending calls responsive to digit pulses transmitted from calling ones of said subscriber lines, at least a part of said last-named means including equipment having unused capacity, means for intercepting calls extended to said unused capacity, means responsive to said interception for transmitting signals to said calling subscribers for indicating that no more digit pulse trains should be transmitted by said calling subscriber, means for further extending said intercepted calls after said calling subscriber quits transmitting digit pulses, means for playing back a recording explaining why said intercepted calls may not be completed, means for extending said intercepted calls to said playing back means at the start of said recording, and means for releasing said intercepted calls at the end of said recording.

8. The telephone system of claim 7 and means for canceling said further extension of said intercepted calls if said calling subscriber should thereafter resume transmitting digit pulses.

9. The telephone system of claim 8 wherein said means for further extending said intercepted calls comprises a slow release relay for extending talking conductors a predetermined period of time after termination of a digit pulse train and said means for canceling said further extension of said intercepted calls comprises means for reoperating said slow release relay to open said talking conductors.

10. The telephone system of claim 8 and means for once more further extending said intercepted calls after said calling subscriber quits said resumed transmission of digit pulses.

References Cited in the file of this patent

UNITED STATES PATENTS

| | | |
|---|---|---|
| 2,207,855 | Franklin | July 16, 1940 |
| 2,706,750 | Pharis | Apr. 19, 1955 |
| 2,715,160 | Pharis | Aug. 9, 1955 |
| 2,764,636 | Gray | Sept. 25, 1956 |

UNITED STATES PATENT OFFICE

CERTIFICATE OF CORRECTION

Patent No. 2,892,890 June 30, 1959

William W. Pharis

It is hereby certified that error appears in the printed specification of the above numbered patent requiring correction and that the said Letters Patent should read as corrected below.

Column 2, line 16, strike out "the" and insert instead -- recorder and --; line 19, for "to and" read -- to recorder and --; column 3, line 43, for "recorder" read -- recorded --.

Signed and sealed this 15th day of December 1959.

(SEAL)
Attest:

KARL H. AXLINE
Attesting Officer

ROBERT C. WATSON
Commissioner of Patents